United States Patent [19]
Buford, III et al.

[11] Patent Number: 5,178,822
[45] Date of Patent: Jan. 12, 1993

[54] STEAM GENERATOR CORROSION MONITORING SYSTEM AND METHOD

[75] Inventors: Albert C. Buford, III, Cabot; Donal W. Moore, Russellville, both of Ark.; James E. Nestell, Jr., Alexandria, Va.

[73] Assignee: Arkansas Power and Light Company, Little Rock, Ark.

[21] Appl. No.: 764,612

[22] Filed: Sep. 24, 1991

[51] Int. Cl.[5] .......................................... G21C 17/017
[52] U.S. Cl. ................... 376/305; 122/504; 122/379; 122/382; 73/866.5; 73/86; 204/153.11; 204/404; 324/71.2; 324/700; 324/724; 165/11.1; 422/53; 376/245; 376/249
[58] Field of Search .............. 376/245, 249, 305, 246, 376/247, 248; 324/71.2, 700, 450, 724; 165/11.1; 204/153.11, 404; 122/504, 379, 382, 392; 73/86, 866.5; 422/53; 436/6

[56] References Cited

U.S. PATENT DOCUMENTS

| | | | |
|---|---|---|---|
| 4,044,605 | 8/1977 | Bratthäll | 73/61.2 |
| 4,351,703 | 9/1982 | Winslow, Jr. | 204/1 T |
| 4,563,427 | 1/1986 | Weiss et al. | 436/6 |
| 4,635,589 | 1/1987 | Draper et al. | 122/396 |
| 4,727,826 | 3/1988 | Draper et al. | 122/379 |
| 4,762,168 | 8/1988 | Kawabe et al. | 165/11.1 |
| 5,060,600 | 10/1991 | Brown et al. | 122/379 |

FOREIGN PATENT DOCUMENTS

| | | | |
|---|---|---|---|
| 225786 | 8/1985 | Fed. Rep. of Germany | 73/86 |
| 237220 | 7/1986 | Fed. Rep. of Germany | 73/86 |

*Primary Examiner*—Donald P. Walsh
*Assistant Examiner*—Chrisman D. Carroll
*Attorney, Agent, or Firm*—Robert C. Tucker; William David Kiesel; C. Dean Domingue

[57] ABSTRACT

In combination with a steam generator having a plurality of generator tube support plates, each generator tube support plate having a plurality of openings and a plurality of generator tubes, each tube passing through aligned openings in the support plates, a corrosion monitoring system is provided including a mockup probe, comprising a probe tube support plate having an upper side and a lower side and having substantially the same thickness and being constructed of substantially the same material as the generator tube support plates, having at least one opening of substantially the same size and shape as the openings of the generator tube support plates; at least one probe tube having an upper end and a lower end and having substantially the same diameter as the generator tubes and being constructed of substantially the same material as the generator tubes, the probe tube passing through the opening of the probe tube support plate; and wherein the mockup probe is adapted such that it may be inserted and sealed within the steam generator during chemical cleaning operations. The mockup probe is preferably used in combination with electronic linear polarization and zero resistance ammetry probes, which electronically measure corrosion during cleaning operations.

17 Claims, 5 Drawing Sheets

STEAM GENERATOR CORROSION MONITORING SYSTEM AND METHOD

BACKGROUND OF THE INVENTION

1. Field of the Invention

This invention relates generally to corrosion monitoring systems and methods and, more particularly, to corrosion monitoring systems and methods for use in steam generators to monitor the corrosive effects of chemical cleaning of steam generators.

2. Prior Art

Certain nuclear power stations using pressurized water reactor technology utilize a large heat exchanger, known as a steam generator, to transfer heat from the reactor coolant system (i.e. heat generated during nuclear fission) to a secondary system. The heat transfer results in the boiling of secondary steam feedwater, which produces steam to drive the plant's turbine, which in turn powers the electric generator. The steam is then condensed and returned to the steam generator in a continuous recirculation loop. The secondary feedwater contains trace quantities of contaminants, primarily iron oxide, which tend to plate out inside the steam generator, eventually resulting in flow blockage, corrosion, and/or loss of heat transfer capability. An emerging mitigation method for removing such contaminants involves the use of a chemical solvent, usually during unit shutdown, to dissolve the contaminants.

One of the concerns with chemical cleaning is the potential for corrosion of steam generator internal components by the cleaning solvent. There are a number of steam generator internal components which are potentially susceptible to chemical cleaning corrosion, primarily carbon steel components and welds and, more particularly, those which are influenced by the galvanic fields of the more noble metals (e.g. Inconel 600, a Ni-Cr-Fe alloy) generally used for steam generator tubing. With the additional criteria that tube support structures (usually constructed of carbon steel) have very low corrosion allowances, the corrosion of tube support structures frequently becomes the controlling factor in chemical cleaning. Tube support structures are components of the steam generator which provide lateral support to the primary 10 water tubes in order to prevent excessive vibration. Actual tube support structure corrosion after cleaning cannot be measured due to accessibility problems.

There are basically two types of corrosion of concern in chemical cleaning: free corrosion due to base metal contact with the cleaning solvent, and galvanic corrosion, which is induced by metals such as Inconel 600 in the proximity of a base metal such as carbon steel. Total corrosion is the sum of free corrosion and galvanic corrosion. In order to monitor corrosion caused by chemical cleaning operations, and to assure that excessive base metal is not removed along with the contaminants, corrosion monitoring systems can be utilized during cleaning.

There are generally two prior art methods to measure corrosion in a steam generator: (1) coupons and (2) electronic measurements. "Coupons" are simply sample pieces of base metal which are inserted into the steam generator during cleaning operations. At a desired time, the coupons are removed to measure actual corrosion which took place inside the steam generator. Coupons can provide either free or total corrosion measurements, depending on the location of the coupons. By coupling Inconel 600 to base metal coupons, with appropriate area ratios maintained to approximate the effective area ratios of the two metals in the steam generator, one can obtain an approximation of total corrosion. The correlation of the corrosion of the coupon to actual tube support structure corrosion depends upon how well the geometric similarity within the steam generator is approximated by the coupons Without the ability to perform full scale testing, or to measure actual tube support structure corrosion in field applications, the accuracy of the correlation is uncertain. Based upon the relatively low allowable tube support structure corrosion (as low as three mils total corrosion), the need exists for maximum assurance that corrosion correlations are accurate. Premature total corrosion correlations in excess of the allowable may result in corresponding premature replacement of the steam generator at great expense. Due to the unknown accuracy of coupon measurements caused by uncertain geometric relationships, the use of galvanic coupons to approximate total corrosion has been suspect. Additionally, corrosion coupons can only be checked after the cleaning process is complete or by interrupting the process, and on-line monitoring is desirable to assure the process remains under control, with low corrosion rates.

Electronic measurement of corrosion ca be utilized to monitor corrosion on-line during the chemical cleaning process. Linear polarization ("LP") probes provide an indication of free corrosion, while zero resistance ammetry ("ZRA") probes provide an indication of galvanic corrosion. The accuracy of electronic readings is also suspect due to the influence of the relative configurations within the steam generator as compared to the conditions surrounding the probes. This influence is due to both the galvanic fields created as a result of geometry and to the local chemistry conditions (e.g. in the crevices between the primary water tubes and the tube support structure).

Previous corrosion monitoring schemes used in the field utilized LP and ZRA probes located inside the few access points available in steam generators. The required proximity to the tube/tube support structure, and the effects on measured versus actual corrosion were uncertain, although there was fairly good correlation between electronic and coupon corrosion. Additionally, some utilities placed large scale tube support structure mockups in side stream monitors which took solvent from the steam generator during cleaning operations and recirculated the solvent through the monitor to attain more realistic geometry. The mockups could be accessed for actual measurements to correlate with the electronic indications, and to better correlate to actual tube support structure/tube geometry. However, concern existed that the chemical environment within the mockup would not be identical to that in the steam generator due to temperature losses in the recirculation system and the absence of the relatively short-lived intermediate species which occur during sludge dissolution within the steam generator (which accounts for a large percentage of the total corrosion). The intermediate species is believed to react to become a less aggressive species before reaching the mockup via recirculation. Testing performed by Electric Power Research Institute utilized large scale configurations of tube support geometry to assess the importance of geometry on corrosion monitoring. The results indicated that certain aspects of the geometry were critical, including the length of tubing on either side of the tube support structure.

SUMMARY OF THE INVENTION

Therefore, it is an object of this invention to provide a steam generator corrosion monitoring system and method which provides an accurate model of actual corrosion which takes place during chemical cleaning.

It is another object of this invention to provide a steam generator corrosion monitoring system and method which not only provides an accurate model of actual corrosion, but also provides an on-line electronic monitoring system which monitors the environment in steam generator and/or in the model.

It is still another object of this invention to provide a steam generator corrosion monitoring system and method which is easily operable within a steam generator without substantial modifications to the steam generator.

It is a further object of this invention to provide a steam generator corrosion monitoring system and method which is economical and efficient to operate and administer during chemical cleaning operations.

Accordingly, in combination with a steam generator having a plurality of generator tube support plates, each generator tube support plate having a plurality of broached openings or openings formed by other means and a plurality of generator tubes, each tube passing through aligned openings in the support plates, a corrosion monitoring system is provided including a mockup probe, comprising a probe tube support plate having an upper side and a lower side and having substantially the same thickness and being constructed of substantially the same material as the generator tube support plates, having at least one opening of substantially the same size and shape as the openings of the generator tube support plates; at least one probe tube having an upper end and a lower end and having substantially the same diameter as the generator tubes and being constructed of substantially the same material as the generator tubes, the probe tube passing through the opening of the probe tube support plate; and wherein the mockup probe is adapted such that it may be inserted and sealed within the steam generator during chemical cleaning operations.

The mockup probe is preferably use in combination with electronic linear polarization and zero resistance ammetry probes, which electronically measure corrosion during cleaning operations.

DETAILED DESCRIPTION OF PREFERRED EMBODIMENTS OF THE INVENTION

Figure 1:
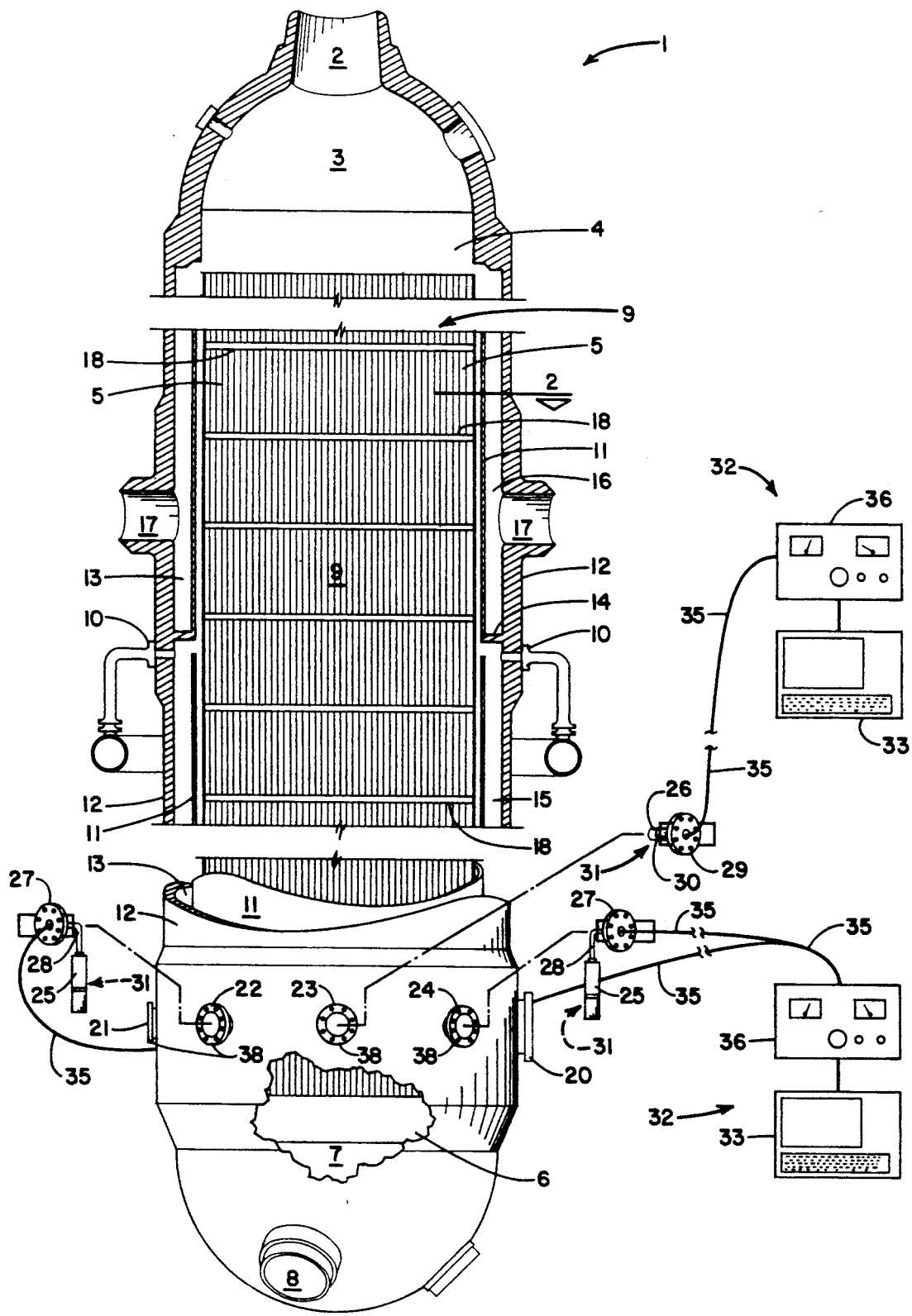
FIG. 1 is a partial cutaway view of a steam generator.

FIG. 1 depicts a conventional once through steam generator 1, commonly referred to as an "OTSG." The OTSG of FIG. 1 is similar to an OTSG manufactured by Babcock and Wilcox, Model 177 FA as well as the OTSG described in U.S. Pat. No. 4,158,387 and others known in the art. The OTSG 1 is a large tube bundle heat exchanger. Heated primary coolant water from the nuclear reactor core enters OTSG 1 through primary inlet 2 into an inlet chamber 3, where it is distributed by upper tubesheet 4 through a plurality of generator tubes 5 and collected at lower tubesheet 6. From lower tubesheet 6 the primary water flows into outlet chamber 7 and then through primary outlet 8, from which it returns to the reactor 1 core to be reheated. The generator tubes 5 are collectively referred to as a tube bundle 9. Tube bundle 9 typically contains thousands of generator tubes 5.

Heat from generator tubes is transferred to secondary feedwater which is injected into the OTSG through main feedwater nozzles 10. Tube bundle shroud 11 surrounds tube bundle 9 and outer casing 12 surrounds tube bundle shroud 11. An annulus 13 is thus formed between shroud 11 and casing 12. A partition ring 14 separates the annulus 13 into a downcomer annulus 15 and a steam annulus 16. Secondary feedwater is injected into downcomer annulus 15 through feedwater nozzles 10 and moves upwardly through tube bundle 9 within shroud 11. Steam is formed as secondary feedwater rises within shroud 11 and is heated by generator tubes 5. Steam then exits the OTSG through steam annulus 16 and steam outlets 17.

Figure 2:
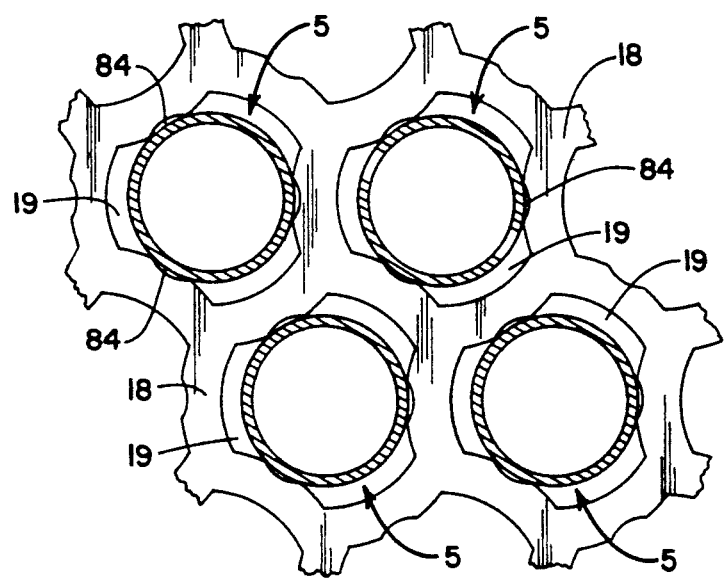
FIG. 2 is a partial sectional view of a tube support plate and steam generator tubes taken along section line 2 of FIG. 1.
Figure 3:
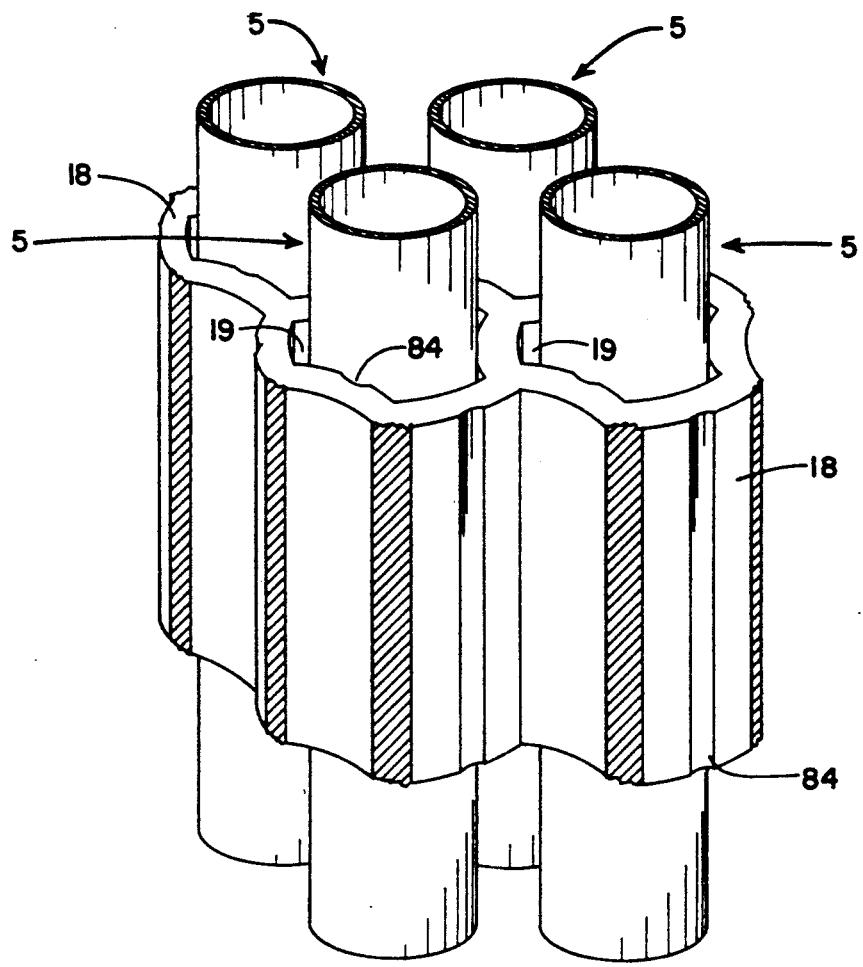
FIG. 3 is a perspective view of the section shown in FIG. 2.

As shown in FIGS. 1-3, generator tubes 5 are held in place by a plurality of generator tube support plates 18. Generator tube support plates 18 may take various forms, and are rigid support structures which allow secondary feedwater to flow around generator tubes 5 while providing stability to the tube bundle 9. Secondary feedwater flows through openings 19 (such as the broached openings shown in the Figures) in tube support plates 18. It should be understood that the term "tube support plate" refers to any tube support structure which performs the same function as those shown in the Figures, including without limitation drilled plates, support crates, support strips or similar structures. Chemical cleaning operations are aimed at removing sludge which has built up in openings 19 or sludge which has deposited on tubes and reduced the heat transfer capability of the steam generator. As stated previously, generator tubes 5 are commonly constructed of metal such as Inconel 600, while tube support plates 18 are constructed of a base metal such as carbon steel. As chemical cleaning takes place, it is critical that corrosion of tube support plates 18 be minimized, such that openings 19 are not overly enlarged, particularly at lands 84, so as to permit excessive vibration of generator tubes 5.

Electronic measurements of corrosion during cleaning are monitored by a mean 31 for electronically determining corrosion within OTSG 1. Means 31 must be adapted such that it may be inserted and sealed within OTSG 1 during chemical cleaning, and must be electronically connected to a data acquisition means 32, such as a corrosion monitor 36 (such as a Petrolite ® Instruments Model M-1010 or equivalent corrosion monitor for linear polarization measurements, and a Remote Galvanic Corrosion Monitor for zero resistance ammetry measurements). A dedicated computer 33 (such as an IBM ® PC-XT or equivalent personal computer) having a software package for data storage and analysis may be used to recover and analyze data from each corrosion monitor. It is preferred that data acquisition means 32 include a primary unit and a backup unit powered by an uninterruptible power supply.

It is also preferable that means 31 be capable of monitoring both free and galvanic corrosion. In the preferred embodiment, means 31 includes separate probes to monitor each form of corrosion. Free corrosion is monitored by a linear polarization ("LP") probe 26 and galvanic corrosion is monitored by a zero resistance ammetry ("ZRA") probe 34. LP probe 26 is a self-contained unit, and ZRA probe 34 is contained within mockup probe 25. Both probes 26,34 are electronically connected to data acquisition means 32 by cables 35.

Actual corrosion during cleaning is measured utilizing mockup probe 25.

Figure 4:
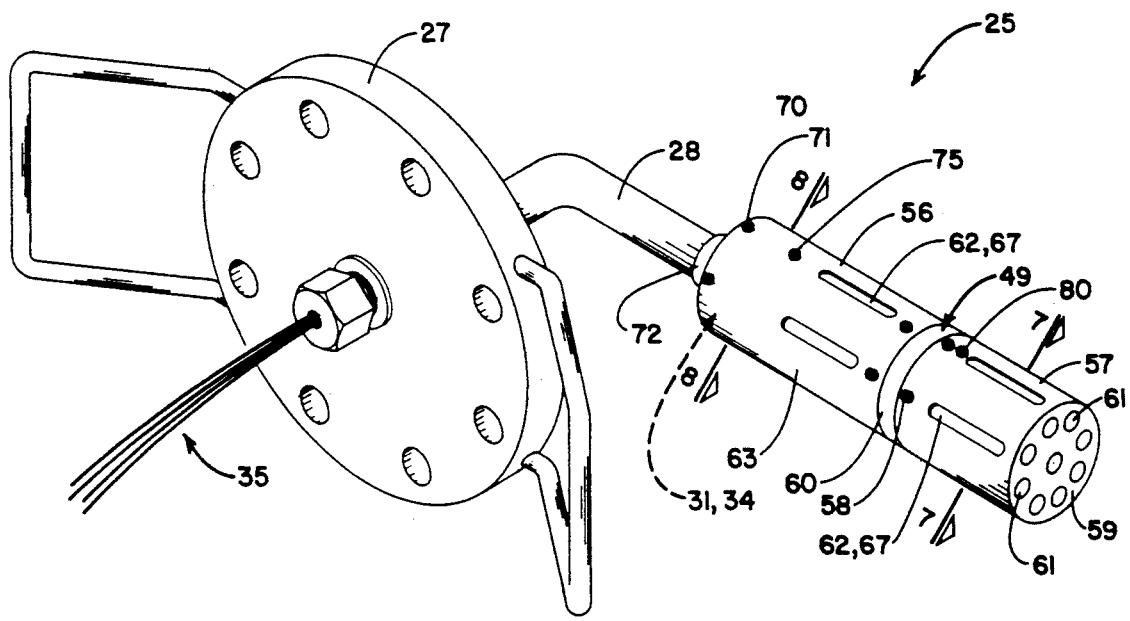
FIG. 4 is a perspective view of an embodiment of the mockup probe of the invention.
Figure 5:
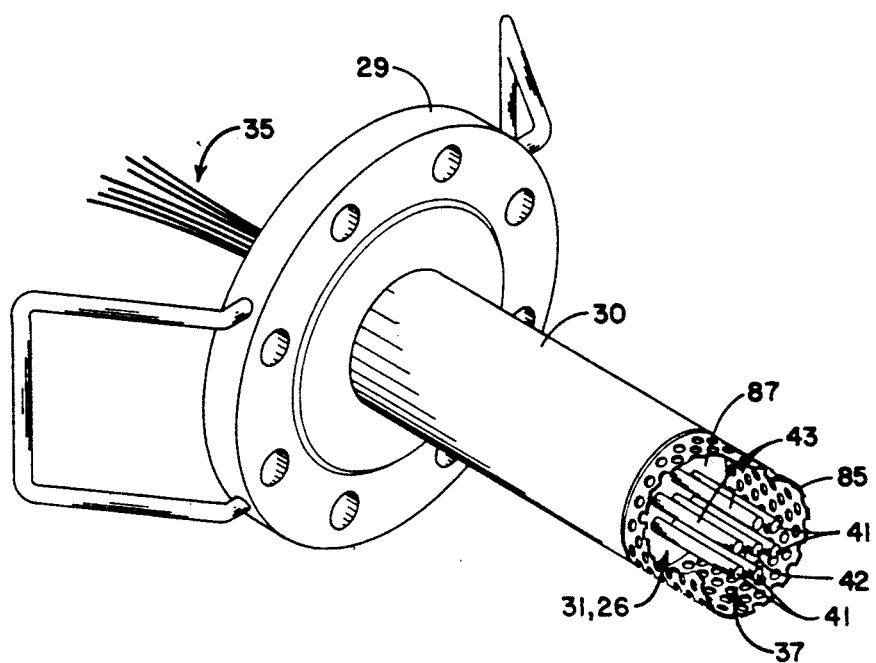
FIG. 5 is a perspective view of an embodiment of the linear polarization probe of the invention.

Access to the interior of OTSG 1 is severely limited. When chemical cleaning takes place, chemical solvent is pumped into OTSG 1 typically through an access port such as manway 20. Solvent exits OTSG 1 at a convenient point such as handhole 21. Typically, limited access to the interior of OTSG1 is provided through other handholes around the periphery of OTSG 1, such as those shown at 22–24 in FIG. 1, with similar handholes located on the opposite side of OTSG 1. Preferably, three mockup probes 25 and one probe 26 are utilized to monitor corrosion during cleaning operations, in order to provide redundancy and comparative readings on galvanic corrosion. LP probe 26 can be located at handhole 23. One mockup probe 25 should be located as near as possible to the solvent inlet point, such as at handhole 22. A second mockup probe 25 should be placed at a separate point, such as at handhole 24. A third mockup probe 25 (not shown) should be placed at a central location, such as the handhole (not shown) on the opposite side of OTSG 1 from handhole 23. FIG. 4 shows a perspective view of mockup probe 25 attached to a flange 27 (for bolting onto handhole flange 38), via curved conduit 28. When installed, curved conduit 28 allows mockup probe 25 to be positioned in the limited space of downcomer annulus 15. FIG. 5 shows a perspective view of LP probe 26 attached to flange 29 (for bolting onto handhole flange 38), via conduit 30. When installed, LP probe protrudes through handhole 23 and into downcomer annulus 15.

Figure 6:
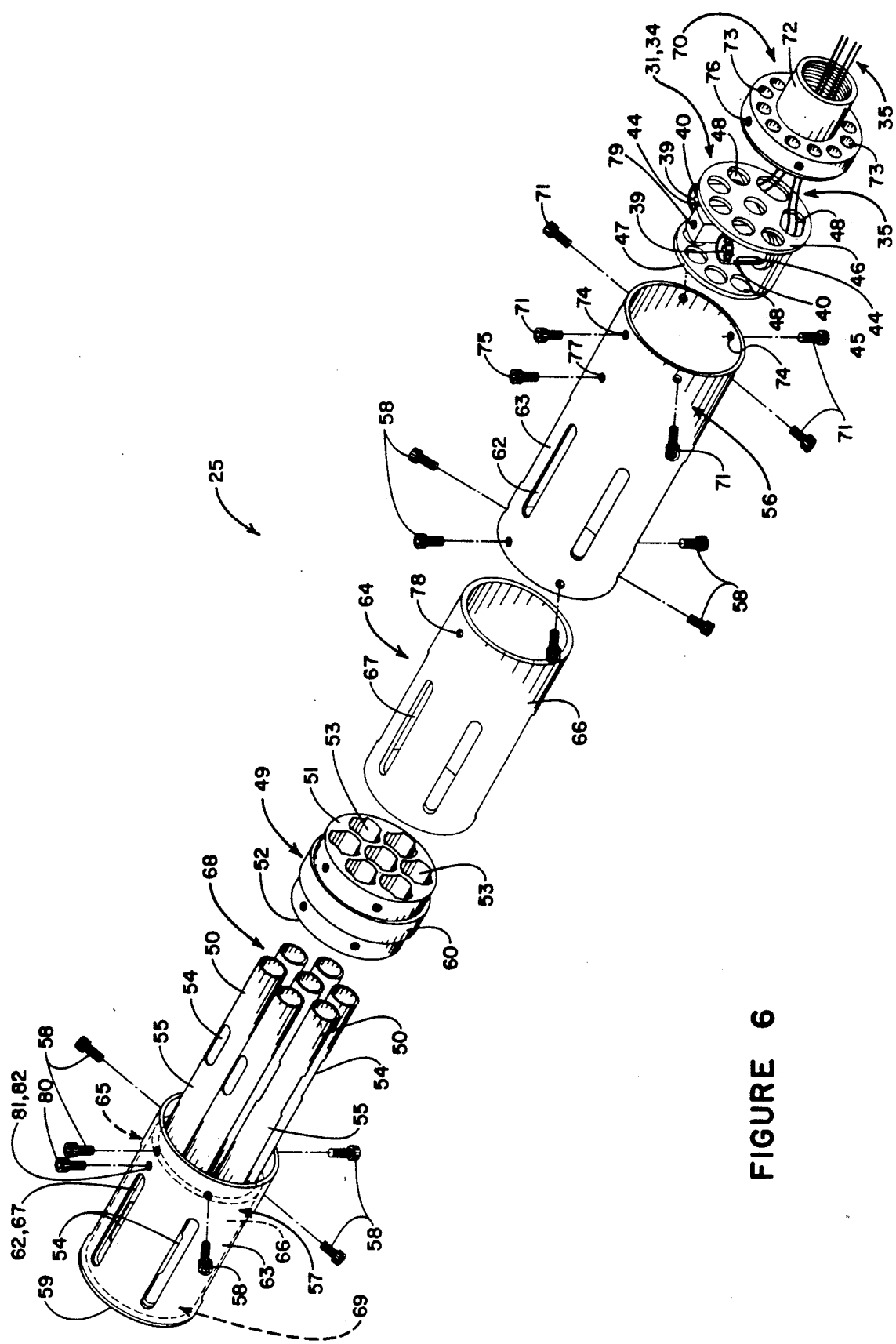
FIG. 6 is an exploded view of an embodiment of the mockup probe of the invention.
Figure 8:
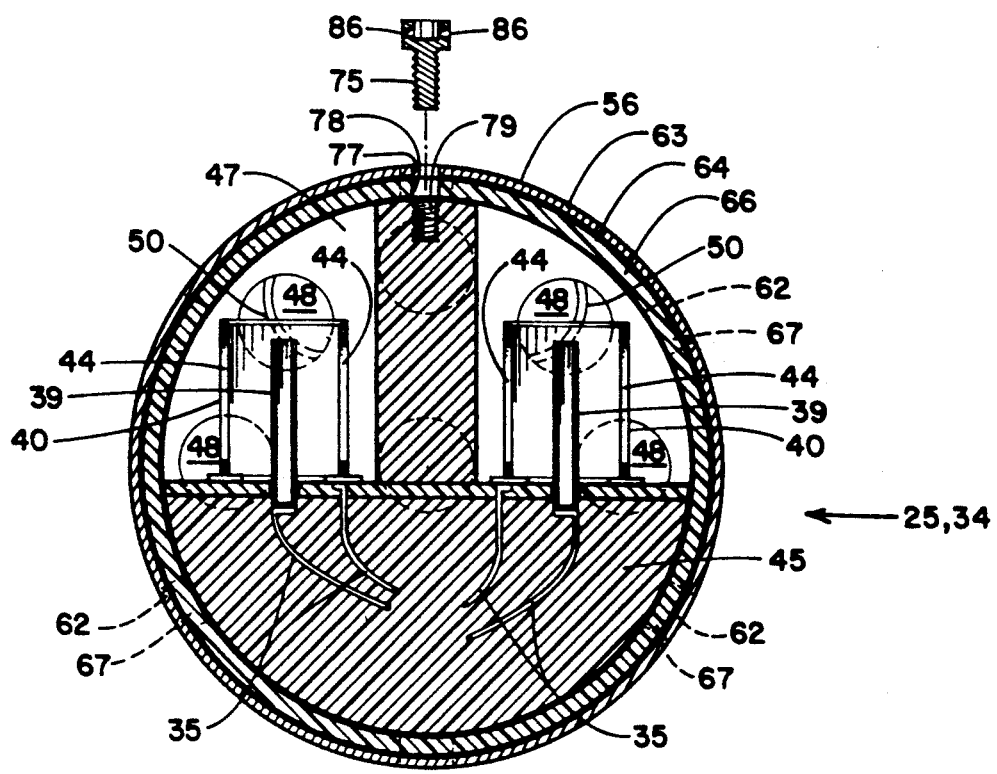
FIG. 8 is a sectional view of the mockup probe of the invention taken along section line 8—8 of FIG. 4.

LP probe 26 provides real-time, in-generator monitoring of free corrosion rates during chemical cleanings of OTSG 1, independent of ZRA probe 34. The LP probe 26 shown in FIG. 5 provides instrumentation for three data channels in OTSG 1 during the iron dissolution steps and/or copper dissolution steps of chemical cleaning. All electrodes 37 are mounted in one 7-electrode chuck 87, and are electronically connected to acquisition means 32 via shielded cables 35, with connections which pass through conduit 30. Electrodes 37 are protected by a protective screen 85. In actual operation at Arkansas Nuclear One —Unit 1(ANO-1) at Russelville, Ark., corrosion of A515 Gr 70 support plate base metal was measured by two of the LP test circuits (two A515 Gr 70 electrodes 41 and one auxiliary electrode 42 per circuit), and E7018 weld-metal corrosion was measured by a third test circuit (two E7018 electrodes 43 and one auxiliary electrode 42 (i.e. one A515 Gr 70 base metal electrode as a meter prover) per circuit). The auxiliary electrode 42 is shared by all three test circuits. ZRA probe 34 provides real-time, in-generator monitoring of galvanic corrosion rates during chemical cleanings of OTSG 1, independent of LP probe 26. The ZRA probe 34 shown in FIGS. 6 and 8 provides instrumentation for six data channels in OTSG 1 during the iron dissolution steps and/or copper dissolution steps of chemical cleaning. A ZRA probe 34 for two data channels is located in each of the three mockup probes 25. Each data channel includes a cylindrical base metal (such as carbon steel [515 Gr 70]) anode 39 centered inside a length of Inconel (Alloy 600) tubing, which serves as a cathode 40. Slots 44 are provided in each cathode 40 to assure circulation of cleaning solvent within ZRA probe 34. Anodes 39 and cathodes 40 are sized to maintain the Inconel-to-carbon-steel surface area ratios that exist in the steam generator (between tubes 5 and support plates 18 and shroud 11) in order to achieve the desired galvanic efect. Anodes 39 and cathodes 40 are supported by electrode mount 45, preferably molded from a plastic, such as polysulfone. Upper plate 46 and lower plate 47 are also constructed of polysulfone and serve to position ZRA probe 34 within mockup probe 25. Holes 48 are formed in plates 46,47 to allow for circulation of cleaning solvent through ZRA probe 34 and mockup probe 25. Anodes 39 and cathodes 40 are electronically connected to data acquisition means 32 via cables 35, with connections which pass through conduit 28.

It should be noted that, for both ZRA and LP measurements, data from the copper dissolution steps should not b included in the calculations of total cumulative corrosion. Galvanic corrosion currents measured by ZRA probe 26 and LP probe 34 during the copper steps are due to the dissolution of copper, and to oxidation and reduction reactions occurring in the solvent at the surface of electrodes, and do not involve the dissolution (i.e. corrosion) of electrodes.

As shown in FIG. 6, mockup probe 25 is designed to approximate as closely as possible the physical relationship between generator tubes 5 and generator tube support plates 18. The basic components of mockup probe 25 are probe tube support plate 49 and at least one probe tube 50. Probe tube support plate 49 has and upper side 51 and a lower side 52, and should have substantially the same thickness and should be constructed of substantially the same material as generator tube support plates 18. Probe tubes 50 should have substantially the same diameter and should be constructed of substantially the same material as generator tubes 5. Each probe tube 50 passes through an opening 53 in probe tube support plate 49, which should have substantially the same size and shape as openings 19 in generator tube support plates 18 (e.g., if openings 19 are broached openings, opening 53 should be a breached opening of the same size and configuration).

It is preferred that a plurality of openings 53 and probe tubes 50 are provided in order to provide multiple sites for actual corrosion measurement. While engineering judgment may vary as to the preferred number of probe tubes 50, seven probe tubes 50 were used in each mockup probe 25 used in corrosion measurements at ANO-1. The spacing between openings 53 should be geometrically similar to the corresponding spacing on generator tube support plates 18. It is also preferred that probe tubes 50 be of such length that the galvanic corrosion of probe tube support plate 49 during exposure to chemical cleaning solvent approximates that of generator tube support plates 18. In order to accommodate installation of mockup probe 25 in the limited space of OTSG 1, the length of probe tubes 50 was reduced by providing openings 54 in probe tube sidewalls 55. Openings 54 expose the surface area inside probe tubes 50 to the solvent providing the same galvanic effect as longer probe tubes 50. It is preferred that each probe tube have openings 54 above and below probe tube support plate 49. While engineering judgment may vary as to the preferred length of probe tubes 50, a length of seven and one-half inches was used for probe tubes 50 (with openings 54) in corrosion measurements at ANO-1, where the average spacing between generator tube support plates 18 is approximately three feet.

Figure 7:
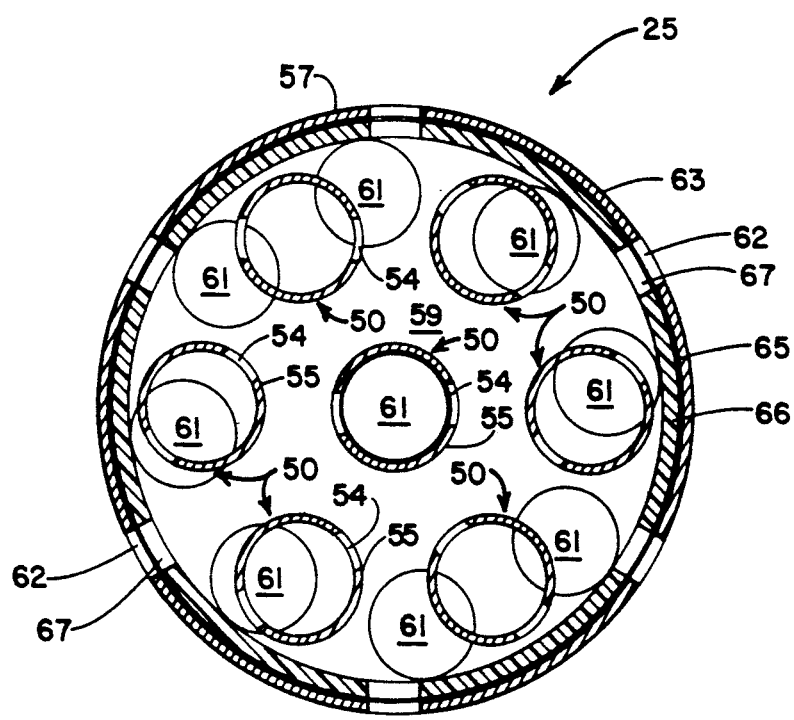
FIG. 7 is a sectional view of an embodiment of the mockup probe of the invention taken along section line 7—7 of FIG. 4.

Mockup probe 25 is encased by an upper protective sleeve 56 and a lower protective sleeve 57, which are connected to probe tube support plate 49 with screws 58. Flange 60 on probe tube support plate 49 assures a flush exterior surface for mockup probe 25 when protective sleeves 56 and 57 are installed. A base plate 59 (see FIGS. 4 and 7) is fixedly attached across the bottom of lower protective sleeve 57 by conventional means such as welding. Protective sleeves 56,57 and base plate 59 are preferably constructed of stainless steel. Probe tubes 50 are grounded to probe tube support plate 49 by tack-welding tubes 50 to base plate 59. Openings 61 are provided in base plate 59 to allow free chemical solvent circulation around and inside of probe tubes 50. Openings 62 are also provided in sidewalls 63 of protective sleeves 56,57 for the same purpose.

It is preferable that upper insulating sleeve 64 (abutting upper side 51 of probe tube support plate 49) and lower insulating sleeve 65 (abutting lower side 52 of probe tube support plate 49) are provided, each having a sidewall 66 surrounding probe tubes 50 and separating them from protective sleeves 56,57. Insulating sleeves 64,65 are constructed of an insulating material, such as polysulfone, and serve the purpose of insulating the galvanic fields within mockup probe from exterior reactions and from protective sleeves 56,57. Openings 67 in sidewalls 66 are aligned with openings 62 in protective sleeves 56,57. Lower insulating sleeve 65 is held in position by positioning screw 80, which passes through positioning screw hole 81 in lower protective sleeve 57 and into threaded positioning screw hole 82 in lower insulating sleeve 65.

It is preferred that both insulating sleeves 64,65 and both protective sleeves 56,57 extend upward at least to the upper ends 68 and downward at least to lower ends 69 of probe tubes 50. Of course, alternate designs are possible, wherein a single insulating sleeve and/or a single protective sleeve surrounds both probe tube support plate 49 and probe tubes 50.

Lower plate 47 of ZRA probe 34 fits matingly within upper insulating sleeve 64, and upper plate 46 rests on top of upper insulating sleeve 64, positioning ZRA probe 34 just above upper ends 68 of probe tubes 50. ZRA probe 34 is thus contained by upper insulating sleeve 64 and upper protective sleeve 56. ZRA probe 34 and upper insulating sleeve 64 are held in position by positioning screw 75, which passes through positioning screw hole 77 in upper protective sleeve 56, positioning screw hole 78 in upper insulating sleeve 64 and into threaded positioning screw hole 79 in ZRA electrode mount 45. As can be seen in FIG. 8, it is preferred that positioning screw 75 together with all other exterior screws 58,71,80 are provided with a retention hole 86.

During use of mockup probe 25 within OTSG 1 all screws 58,71,75,80 may be connected together by a single wire (not shown) passing through retention holes 86, preventing a loose screw from detaching and dropping into OTSG 1. Adapter 70, preferably constructed of stainless steel, rests on top of upper plate 46 and is matingly contained by upper protective sleeve 56. Adapter 70 is held in place by adapter screws 71, which pass through adapter screw holes 74 in upper protective sleeve 56 and into threaded adapter screw holes 76 in adapter 70. Electronic connection cables 35 from ZRA probe 34 pass through threaded cylindrical neck 72 of adapter 70, which attaches to conduit 28. Flow holes 73 allow chemical solvent to flow through adapter 70.

In operation, mockup probes 25, each containing a ZRA probe 34, are installed in OTSG 1, as is LP probe 26. All cable connections are made to data acquisition means 32, preferably including separate computers 33 to monitor LP and ZRA readings. Chemical cleaning operations are initiated, with personnel monitoring the real-time readings on computers 33. Of course, should excessive corrosion be detected, cleaning operations can be suspended and mockup probes 25 removed to examine actual corrosion of probe tube support plates 49. Upon completion of chemical cleaning operations, mockup probes 25 are removed and actual corrosion of probe tube support plate lands 83 is carefully measured. Thus, real-time electronic readings are verified and the post-cleaning condition of OTSG tube support plates 18 is established.

Other alternate embodiments of the invention will occur to those skilled in the art, and are intended to be included within the scope and spirit of the following claims.

We claim:

1. In combination with a steam generator having a plurality of generator tube support plates, each said generator tube support plate having a plurality of openings, and a plurality of generator tubes, each said generator tube passing through aligned said openings in said support plates, a corrosion monitoring system including a mockup probe, comprising:
   a. a probe tube support plate having an upper side and a lower side and having substantially the same thickness and being constructed of substantially the same material as said generator tube support plate, having at least one opening of substantially the same size and shape as said openings of said generator tube support plates;
   b. at least one probe tube having a sidewall, an upper end and a lower end, having substantially the same diameter as said generator tubes and being constructed of substantially the same material as said generator tubes, said probe tube passing through said opening of said probe tube support plate; and wherein said mockup probe is positioned within said steam generator such that said mockup probe is exposed to chemical cleaning fluids within said steam generator during chemical cleaning operations.

2. A combination according to claim 1, further comprising:
   c. a means for electronically determining corrosion within said steam generator;
   wherein said means is positioned within said steam generator such that said means is exposed to chemical cleaning fluids within said steam generator during chemical cleaning operations, and wherein said means is electronically connected to a data acquisition means.

3. A combination according to claim 2, wherein said means for electronically determining corrosion within said steam generator includes a zero resistance ammetry probe, having an anode constructed of substantially the same material as said generator tube support plates, and a cathode constructed of substantially the same material as said generator tubes; wherein said zero resistance ammetry probe is positioned within said steam generator such that said zero resistance ammetry probe is exposed to chemical cleaning fluids within said steam generator during chemical cleaning operations; and wherein said zero resistance ammetry probe is electronically connected to a data acquisition means.

4. A combination according to claim 3, wherein said means for electronically determining corrosion within said steam generator includes a linear polarization probe, having an electrode constructed of substantially the same material as said generator tube support plates; wherein said linear polarization probe is positioned within said steam generator such that said linear polarization probe is exposed so chemical cleaning fluids within said steam generator during chemical cleaning operations; and wherein said linear polarization probe is electronically connected to a data acquisition means.

5. A combination according to claim 4, wherein said steam generator includes interior components connected by welds and wherein said linear polarization probe includes an electrode constructed of substantially the same material as said welds.

6. In a steam generator having a plurality of generator tube support plates, each said generator tube support plate having a plurality of openings, and a plurality of generator tubes, each said generator tube passing through aligned said openings in said support plates, a method for monitoring corrosion, comprising the steps of:

inserting into said steam generator a mockup probe such that said mockup probe is exposed to chemical cleaning fluids within said steam generator during chemical cleaning operations, said mockup probe including:

a probe tube support plate having substantially the same thickness and being constructed of substantially the same material as said generator tube support plates, having at least one opening of substantially the same size and shape as said openings of said generator tube support plates; and at least one probe tube having substantially the same diameter as said generator tubes and being constructed of substantially the same material as said generator tubes, said probe tube passing through said opening of said probe tube support plate;

conducting chemical cleaning operations;

removing said mockup probe; and observing actual corrosion of said mockup probe.

7. A method for monitoring corrosion according to claim 6, further comprising the steps of:

prior to said step of conducting chemical cleaning operations, inserting into said steam generator a means for electronically determining corrosion of said tube support plates such that said means is exposed to chemical cleaning fluids within said steam generator during chemical cleaning operations, said means being electronically connected to a data acquisition means; and monitoring said data acquisition means during said step of conducting chemical cleaning operations.

8. A corrosion monitoring system according to claim wherein said sidewall of said probe tube is provided with at least one opening therein.

9. A corrosion monitoring system according to claim 1, wherein a plurality of said openings are provided in said probe tube support plate; wherein a plurality of said probe tubes are provided, each said probe tube passing through one said opening of said probe tube support plate; and wherein said probe tubes are of such length that the galvanic corrosion of said probe tube support plate during exposure to a chemical cleaning solvent approximates that of said generator tube support plates.

10. A corrosion monitoring system according to claim 1, wherein said mockup probe further comprises:

c. an insulating sleeve having a sidewall said probe tube above said upper side of said probe tube support plate and below said lower side of said probe tube support plate.

11. A corrosion monitoring system according to claim 10, wherein said mockup probe further comprises:

d. a protective sleeve, having a sidewall surrounding said insulating sleeve.

12. A corrosion monitoring system according to claim 1, wherein said mockup probe further comprises:

c. an upper insulating sleeve having a sidewall surrounding said probe tube above said upper side of said probe tube support plate; and d. a lower insulating sleeve having a sidewall surrounding said probe tube below said lower side of said probe tube support plate.

13. A corrosion monitoring system according to claim 12, wherein said upper insulating sleeve extends upward at least to said upper end of said probe tube and wherein said lower insulating sleeve extends downward at least to said lower end of said probe tube, and wherein said mockup probe further comprises:

e. an upper protective sleeve, having a sidewall surrounding said upper insulating sleeve; and f. a lower protective sleeve, having a sidewall surrounding said lower insulating sleeve.

14. A corrosion monitoring system according to claim 10, wherein said sidewall of said insulating sleeve is provided with a least one opening therein.

15. A corrosion monitoring system according to claim 11, wherein said sidewall of said insulating sleeve is provided with a least one opening therein, and said sidewall of said protective sleeve is provided with at least one opening therein aligned with said opening in said sidewall of said insulating sleeve.

16. A corrosion monitoring system according to claim 12, wherein said sidewall of said upper insulating sleeve is provided with a least one opening therein and said sidewall of said lower insulating sleeve is provided with a least one opening therein.

17. A corrosion monitoring system according to claim 13, wherein said sidewall of said upper insulating sleeve is provided with a least one opening therein, said sidewall of said lower insulating sleeve is provided with a least one opening therein, said sidewall of said upper protective sleeve is provided with at least one opening therein aligned with said opening in said sidewall of said upper insulating sleeve, and said sidewall of said lower protective sleeve is provided with at least one opening therein aligned with said opening in said sidewall of said lower insulating sleeve.

* * * * *